United States Patent
Ohashi et al.

(10) Patent No.: US 12,311,936 B2
(45) Date of Patent: May 27, 2025

(54) VEHICLE MOTION MANAGER, VEHICLE CONTROL METHOD, AND NON-TRANSITORY STORAGE MEDIUM

(71) Applicants: TOYOTA JIDOSHA KABUSHIKI KAISHA, Toyota (JP); ADVICS CO., LTD., Kariya (JP)

(72) Inventors: Yuta Ohashi, Toyota (JP); Atsushi Kuchinomachi, Tokyo (JP)

(73) Assignees: TOYOTA JIDOSHA KABUSHIKI KAISHA, Toyota (JP); ADVICS CO., LTD., Kariya (JP)

(*) Notice: Subject to any disclaimer, the term of this patent is extended or adjusted under 35 U.S.C. 154(b) by 0 days.

(21) Appl. No.: 18/533,295

(22) Filed: Dec. 8, 2023

(65) Prior Publication Data
US 2024/0262354 A1    Aug. 8, 2024

(51) Int. Cl.
*B60W 30/14*    (2006.01)
*B60W 50/02*    (2012.01)

(52) U.S. Cl.
CPC ...... *B60W 30/143* (2013.01); *B60W 50/0225* (2013.01); *B60W 2720/106* (2013.01)

(58) Field of Classification Search
CPC ......... B60W 2720/106; B60W 30/143; B60W 50/0205; B60W 50/029; B60W 50/0225
See application file for complete search history.

(56) References Cited

U.S. PATENT DOCUMENTS

| | | | |
|---|---|---|---|
| 2020/0070849 A1 | 3/2020 | Suzuki et al. | |
| 2020/0139982 A1* | 5/2020 | Sakamoto | G06F 11/18 |
| 2020/0361478 A1* | 11/2020 | Sakamoto | G05B 9/02 |
| 2020/0361487 A1* | 11/2020 | Sakamoto | G05B 9/02 |
| 2021/0171052 A1* | 6/2021 | Sakai | B60W 50/087 |
| 2022/0242400 A1* | 8/2022 | Kanekawa | B60W 30/18109 |
| 2022/0315022 A1* | 10/2022 | Yoshikawa | G07C 5/02 |

FOREIGN PATENT DOCUMENTS

JP    2020-032894 A    3/2020

* cited by examiner

*Primary Examiner* — Jaime Figueroa
*Assistant Examiner* — Zachary Joseph Wallace
(74) *Attorney, Agent, or Firm* — Oliff PLC

(57) ABSTRACT

A vehicle motion manager includes one or more processors configured to: receive a first acceleration request value that requires degeneration and a second acceleration request value that does not require the degeneration from a first application and a second application, respectively; select a smallest acceleration request value out of the acceleration request values received by the one or more processors; when the one or more processors select the first acceleration request value, repeatedly output a degeneration value based on the first acceleration request value; and output an instruction value corresponding to the acceleration request value selected by the one or more processors or the degeneration value to an actuator of a vehicle. The one or more processors are configured to, in response to selection of the first acceleration request value, receive the degeneration value output by the one or more processors instead of the first acceleration request value.

5 Claims, 3 Drawing Sheets

VEHICLE MOTION MANAGER, VEHICLE CONTROL METHOD, AND NON-TRANSITORY STORAGE MEDIUM

CROSS-REFERENCE TO RELATED APPLICATION

This application claims priority to Japanese Patent Application No. 2023-017024 filed on Feb. 7, 2023 incorporated herein by reference in its entirety.

BACKGROUND

1. Technical Field

The present disclosure relates to a vehicle motion manager, a vehicle control method, and a non-transitory storage medium.

2. Description of Related Art

A vehicle control system disclosed in Japanese Unexamined Patent Application Publication No. 2020-032894 (JP 2020-032894 A) includes a plurality of execution units, a motion manager, and actuators. The execution units execute individual applications. The motion manager receives motion requests from a plurality of applications. The motion manager arbitrates the plurality of motion requests. That is, the motion manager selects one of the motion requests. The motion manager generates an instruction value for the actuator based on the motion request that wins the arbitration (one motion request selected by the arbitration).

SUMMARY

Some motion requests from applications may require degeneration depending on vehicle conditions. For example, when the motion request is an acceleration request, the degeneration of the motion request means that the value of a requested acceleration is brought closer to a predetermined end value over time. It is assumed that, as a result of arbitrating motion requests from a plurality of applications, a motion request requiring degeneration wins the arbitration (is selected). In this case, the motion manager gradually degenerates the motion request depending on the vehicle conditions. Therefore, control over the actuator may be terminated eventually. Even in the situation where the motion request requiring degeneration wins the arbitration, however, there may be a situation where a motion request from another application needs to be fulfilled without terminating the control over the actuator.

A vehicle motion manager according to a first aspect of the present disclosure includes one or more processors configured to: receive acceleration request values from a first application and a second application; select a smallest acceleration request value out of the acceleration request values received by the one or more processors; when the one or more processors select a first acceleration request value, repeatedly output a degeneration value based on the first acceleration request value; and output an instruction value corresponding to the acceleration request value selected by the one or more processors or the degeneration value to an actuator of a vehicle. The one or more processors are configured to, in response to selection of the first acceleration request value, receive the degeneration value output by the one or more processors instead of the first acceleration request value received from the first application. The acceleration request value received from the first application is the first acceleration request value that requires degeneration, and the acceleration request value received from the second application is a second acceleration request value that does not require degeneration. The degeneration value has an initial value that is the first acceleration request value, and the repeatedly output degeneration value approaches a predetermined end value over time.

A vehicle control method according to a second aspect of the present disclosure includes: receiving acceleration request values from a first application and a second application; selecting a smallest acceleration request value out of the received acceleration request values; when a first acceleration request value is selected in the selecting of the acceleration request value, repeatedly outputting a degeneration value based on the first acceleration request value; and outputting an instruction value corresponding to the acceleration request value selected in the selecting of the acceleration request value or the degeneration value to an actuator of a vehicle. The vehicle control method further includes receiving, in response to selection of the first acceleration request value in the selecting of the acceleration request value, the output degeneration value instead of the first acceleration request value received from the first application. The acceleration request value received from the first application is the first acceleration request value that requires degeneration, and the acceleration request value received from the second application is a second acceleration request value that does not require degeneration. The degeneration value has an initial value that is the first acceleration request value, and the repeatedly output degeneration value approaches a predetermined end value over time.

A non-transitory storage medium according to a third aspect of the present disclosure stores instructions that are executable by a computer and that cause the computer to perform functions. The functions include: receiving acceleration request values from a first application and a second application; selecting a smallest acceleration request value out of the received acceleration request values; when a first acceleration request value is selected in the selecting of the acceleration request value, repeatedly outputting a degeneration value based on the first acceleration request value; and outputting an instruction value corresponding to the acceleration request value selected in the selecting of the acceleration request value or the degeneration value to an actuator of a vehicle. The functions further include receiving, in response to selection of the first acceleration request value in the selecting of the acceleration request value, the output degeneration value instead of the first acceleration request value received from the first application. The acceleration request value received from the first application is the first acceleration request value that requires degeneration, and the acceleration request value received from the second application is a second acceleration request value that does not require degeneration. The degeneration value has an initial value that is the first acceleration request value, and the repeatedly output degeneration value approaches a predetermined end value over time.

In each of the above technical concepts, when the acceleration request value that requires degeneration from the first application wins arbitration, the degeneration value that approaches the end value over time is received. Then, the acceleration request value from the second application eventually wins the arbitration. As a result, it is possible to prevent continuation of a situation where a motion request from the second application cannot be realized for a long period.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a vehicle motion manager, a vehicle control method, and a vehicle control program according to one embodiment will be described with reference to the drawings.

Overall Vehicle Configuration

Figure 1:
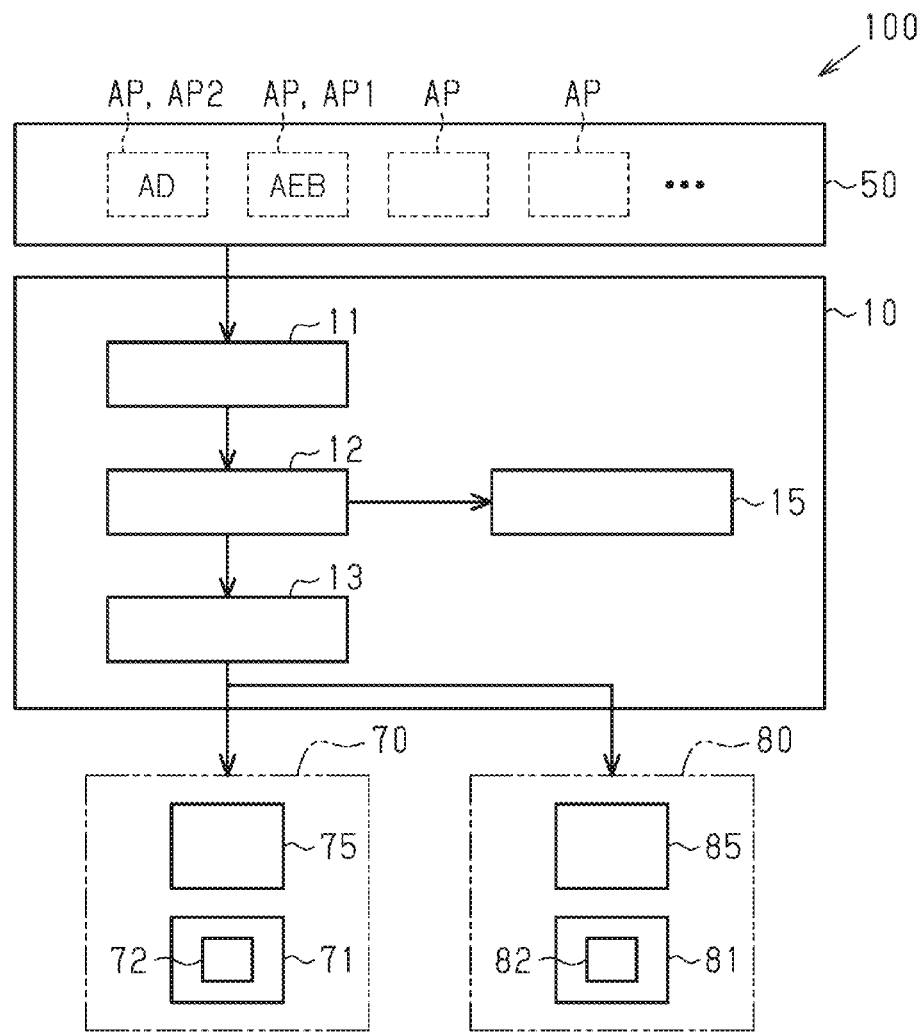
FIG. 1 is a schematic configuration diagram of a vehicle.

As shown in FIG. 1, a vehicle 100 includes a command ECU 50, a management ECU 10, a first actuator system 70, and a second actuator system 80.

The first actuator system 70 includes an engine 71 and an engine ECU 75 that controls the engine 71. The engine 71 is a drive source for the vehicle 100. The engine 71 includes a plurality of actuators 72 such as a throttle valve, a fuel injection valve, and an ignition device. FIG. 1 shows only one of the actuators 72 as a representative. The engine ECU 75 is a computer including a central processing unit (CPU), a non-volatile memory, and a volatile memory. The non-volatile memory prestores various programs describing processes to be executed by the CPU. The engine ECU 75 controls each actuator 72 of the engine 71 based on an instruction value from a host device such as the management ECU 10. Fuel is combusted in the engine 71 by controlling each actuator 72. Along with this, a driving force is generated in the vehicle 100. In this way, the first actuator system 70 includes the actuators 72. The engine 71 includes various sensors for grasping the operation statuses of various parts including the actuators 72. The engine ECU 75 sequentially acquires detection values from these various sensors. If the engine 71 has a failure, the engine ECU 75 detects the failure based on information acquired from the various sensors.

The second actuator system 80 includes a plurality of brake devices 81 and a brake ECU 85 that controls the brake devices 81. FIG. 1 shows only one of the brake devices 81 as a representative. The brake device 81 is provided in each wheel of the vehicle 100. The brake device 81 includes a disc that rotates together with the wheel, brake pads that operate based on a hydraulic pressure, and an actuator 82 that applies the hydraulic pressure to the brake pads. The brake ECU 85 is a computer including a CPU, a non-volatile memory, and a volatile memory. The non-volatile memory prestores various programs describing processes to be executed by the CPU. The brake ECU 85 controls the hydraulic pressure of the actuator 82 based on an instruction value from a host device such as the management ECU 10. A braking force is generated in the vehicle 100 when the brake pads are pressed against the disc in response to the hydraulic pressure control. In this way, the second actuator system 80 includes the actuator 82. Each brake device 81 includes various sensors for grasping the operation statuses of various parts including the actuator 82. The brake ECU 85 sequentially acquires detection values from these various sensors. If the brake device 81 has a failure, the brake ECU 85 detects the failure based on information acquired from the various sensors.

Although illustration is omitted, the vehicle 100 includes actuator systems in addition to the first actuator system 70 and the second actuator system 80. Examples of the other actuator systems include a steering system that adjusts a steering angle of steered wheels of the vehicle 100.

Schematic Configuration of Command ECU

The command ECU 50 is a computer including a CPU, a non-volatile memory, and a volatile memory. The non-volatile memory prestores various programs describing processes to be executed by the CPU. Examples of the programs stored in the non-volatile memory include a plurality of applications AP for controlling motions of the vehicle 100. The command ECU 50 functions as an execution device that executes the applications AP stored therein. When a specific application AP is executed, the command ECU 50 outputs a motion request for the execution target application AP. The command ECU 50 may execute the applications AP simultaneously. The motion request includes an acceleration request value that is a request value for an acceleration to be generated in the vehicle 100. The acceleration request value takes positive and negative values. The command ECU 50 handles a positive value for an acceleration in a case where the vehicle 100 accelerates forward from the vehicle 100. The command ECU 50 sequentially acquires information detected by various sensors (not shown). The command ECU 50 refers to the information acquired from these various sensors when executing the application AP. The various sensors include devices that detect traveling conditions of the vehicle 100, such as a traveling speed of the vehicle 100. The various sensors include devices such as a camera and a radar that detect peripheral information of the vehicle 100. The various sensors include devices that detect current position coordinates of the vehicle 100.

In the following description, the content in which the command ECU 50 is actually involved may be described as a content in which the execution target application AP is involved. For example, the acceleration request value from the command ECU 50 may be described as the acceleration request value from the application AP, and the reception of the acceleration request value from the command ECU 50 may be described as the reception of the acceleration request value from the application AP.

The applications AP stored in the command ECU 50 can be classified broadly into two types that are first applications and second applications. The first application is an application AP that outputs an acceleration request value that requires degeneration when a failure of the vehicle 100 is detected. The degeneration means that the acceleration request value from the application AP is brought closer to a predetermined end value over time. In the present embodiment, the first application is limited to an application AP that outputs a negative acceleration request value. One of the first applications stored in the command ECU 50 is a so-called collision damage reduction braking application that brakes the vehicle 100 to reduce collision damage to the vehicle 100. This application AP is hereinafter referred to as "autonomous emergency braking (AEB) application AP1". There are first applications other than the AEB application AP1, but their description is omitted herein. The second application is an application AP that outputs an acceleration request value that does not require degeneration regardless of whether a failure is detected in the vehicle 100. One of the second applications stored in the command ECU 50 is an application AP that implements an autonomous driving function. This application AP is hereinafter referred to as "autonomous driving (AD) application AP2". By executing the AD application AP2, the vehicle 100 can travel unmanned. There are second applications other than the AD application AP2, but their description is omitted herein. Individual identifiers are preassigned to the applications AP regardless of whether they are the first applications or the second applications.

Schematic Configuration of Management ECU

Figure 2:
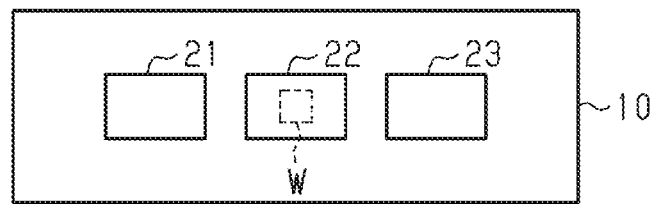
FIG. 2 is a schematic configuration diagram of a management electronic control unit (ECU)

As shown in FIG. 2, the management ECU 10 is a computer including a CPU 21, a non-volatile memory 22, and a volatile memory 23. The non-volatile memory 22 prestores various programs W describing processes to be executed by the CPU 21. The management ECU 10 can exchange information with the command ECU 50 and the ECU of each actuator system via an internal bus (not shown).

By executing the programs W stored in the non-volatile memory 22 by the CPU 21 of the management ECU 10, the management ECU 10 functions as a motion manager that manages motions of the vehicle 100 requested by the applications AP. That is, the management ECU 10 is a control entity of a control method for the vehicle 100. In the following, processes to be executed by the management ECU 10 will be described for the acceleration request value among the motion requests from the applications AP.

The management ECU 10 can execute a management process for centrally managing the acceleration request values from the applications AP. As shown in FIG. 1, the management ECU 10 functions as a reception unit 11, an arbitration unit 12, and an output unit 13 to implement the management process by executing the programs W. The reception unit 11 can receive the acceleration request values from the applications AP. The acceleration request values that can be received by the reception unit 11 include the following three types. The three types of acceleration request value are an acceleration request value that is received from the first application and requires degeneration, an acceleration request value that is received from the first application and does not require degeneration, and an acceleration request value that is received from the second application and does not require degeneration. The arbitration unit 12 selects the smallest acceleration request value from among the plurality of acceleration request values received by the reception unit 11. The arbitration unit 12 may select a degeneration value that is one type of acceleration request value. The degeneration value will be described later. The output unit 13 outputs an instruction value corresponding to the acceleration request value selected by the arbitration unit 12 or the degeneration value to the actuator system.

Figure 3:
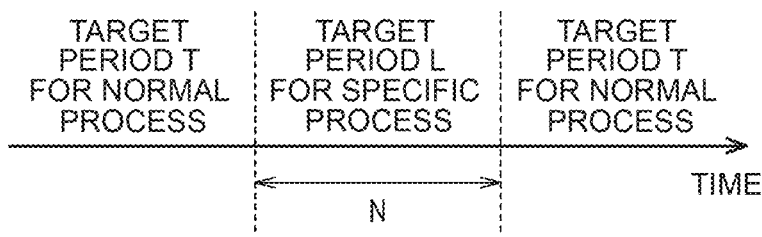
FIG. 3 is a schematic diagram illustrating a period during which a specific process is executed.

As shown in FIG. 3, the management process includes two types of process that are a normal process and a specific process. The normal process is a process intended for a normal period during which no failure is detected in the vehicle 100. The specific process is a failure-specific process intended for a case where a failure is detected in the vehicle 100. Specifically, the specific process is a process intended for an execution period N of a degeneration process described later. The management ECU 10 realizes the acceleration request value from the application AP by executing any of these processes. The management ECU 10 executes the specific process when the arbitration unit 12 has selected an acceleration request value that requires degeneration in the normal process. In the specific process, the reception unit 11 of the management ECU 10 receives the degeneration value instead of the acceleration request value that requires degeneration from the first application.

The management ECU 10 can execute the degeneration process as a process for realizing degeneration of the acceleration request value related to the first application. As shown in FIG. 1, the management ECU 10 functions as a degeneration unit 15 that implements the degeneration process by executing the program W. The degeneration unit 15 executes the degeneration process as a part of a degeneration necessity determination process for determining whether degeneration is necessary. When the arbitration unit 12 has selected an acceleration request value that requires degeneration in the normal process, the degeneration unit 15 outputs, in the degeneration process, a degeneration value for bringing the acceleration request value closer to a predetermined end value over time.

The management ECU 10 acquires information on the presence or absence of failures in various parts of the vehicle 100 as failure information at any time. The failure information is sent from the ECUs such as the engine ECU 75 and the brake ECU 85 that control the various parts of the vehicle 100. As described in relation to the engine ECU 75 and the brake ECU 85, each ECU detects a failure based on sensor detection values or the like.

Management Table

The management ECU 10 prestores a management table. The management table is a table summarizing whether degeneration is necessary for the acceleration request values from the applications AP. In the management table, the following four items are defined for each application AP. The four items are a type of the application AP, an identification value of the application AP, the necessity of degeneration of the acceleration request value based on failure details, and degeneration characteristics defined for cases where degeneration is necessary. The type of the application AP is information indicating whether the application AP is the first application or the second application. The degeneration characteristics are information for calculating the end value to be used when degenerating the acceleration request value. The degeneration characteristics include, for example, information on the degree of degeneration of the acceleration request value. The contents defined in the management table are different between the first application and the second application as follows. That is, in the first application, it is defined that degeneration is necessary depending on details of the failure. In the second application, it is defined that degeneration is unnecessary regardless of details of the failure.

Normal Process

The normal process will be described in detail. As a premise for description of the normal process, the command ECU 50 repeatedly outputs, during execution of a specific application AP, an identification value of the execution target application AP and the acceleration request value of the execution target application AP to the management ECU 10 in a predetermined first cycle.

The management ECU 10 of the present embodiment starts the normal process in response to the start of the AD application AP2 by the command ECU 50. While the command ECU 50 continues to execute the AD application AP2, that is, while the vehicle 100 is performing autonomous driving, the management ECU 10 repeatedly executes the normal process in a predetermined second cycle. The second cycle is, for example, the same as the first cycle.

Figure 4:
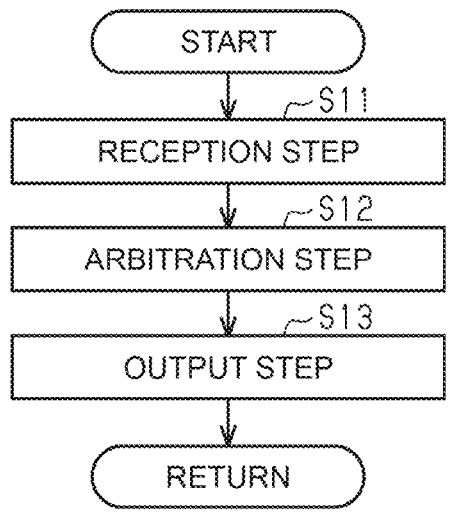
FIG. 4 is a flowchart showing a processing procedure of a management process.

As shown in FIG. 4, the management ECU 10 first executes a process of step S11 in the normal process. In step S11, the reception unit 11 executes a reception step. In the reception step, as shown in FIG. 1, the reception unit 11 receives the latest acceleration request value from the application AP together with the identification value of the application AP. The arrows in FIG. 1 indicate flows of information exchange between the ECUs and between the functional units. As described above, the command ECU 50 may execute a plurality of applications AP simultaneously. In this case, the reception unit 11 receives a plurality of acceleration request values including the acceleration request value from the AD application AP2. In the reception step, the reception unit 11 checks current failure information in addition to the reception of the acceleration request value. Based on the failure information and the management table, the reception unit 11 determines whether degeneration is necessary for the acceleration request value from each application AP. The reception unit 11 determines how to handle each received acceleration request value depending on whether degeneration is necessary. For example, the reception unit 11 handles the acceleration request value from the AD application AP2 as an acceleration request value that does not require degeneration. For example, when an acceleration request value is received from the AEB application AP1, the reception unit 11 handles this acceleration request value as follows. That is, when a vehicle failure associated with the AEB application AP1 is detected, the reception unit 11 handles the acceleration request value from the AEB application AP1 as an acceleration request value that requires degeneration. When the vehicle failure associated with the AEB application AP1 is not detected, the reception unit 11 handles the acceleration request value from the AEB application AP1 as an acceleration request value that does not require degeneration. When each acceleration request value is received as described above, the reception unit 11 generates reception data including a set of the received acceleration request value, the information indicating whether degeneration is necessary, and the identifier of the application AP. The reception unit 11 generates the reception data for each application AP from which the acceleration request value is received. The reception unit 11 outputs all the generated pieces of reception data to the arbitration unit 12. As shown in FIG. 4, when the reception data is output, the management ECU 10 advances the process to step S12.

In step S12, the arbitration unit 12 executes an arbitration step. In the arbitration step, the arbitration unit 12 arbitrates the acceleration request values received by the reception unit 11. When the reception unit 11 has received only one acceleration request value from the AD application AP2, the arbitration unit 12 selects this acceleration request value. When the reception unit 11 has received a plurality of acceleration request values, the arbitration unit 12 selects the smallest acceleration request value from among the received acceleration request values. As shown in FIG. 1, when the acceleration request value is selected, the arbitration unit 12 outputs reception data including the acceleration request value to both the output unit 13 and the degeneration unit 15. Then, the management ECU 10 advances the process to step S13 as shown in FIG. 4.

When the process proceeds to step S13, the management ECU 10 executes an output step. The output step is executed by the output unit 13. As shown in FIG. 1, the output unit 13 outputs, in the output step, an instruction value corresponding to the acceleration request value selected by the arbitration unit 12 to each actuator system. At this time, the output unit 13 distributes the acceleration request value selected by the arbitration unit 12 to the first actuator system 70 and the second actuator system 80. The output unit 13 calculates the instruction value by converting the distributed value into a unit of force. When the acceleration request value selected by the arbitration unit 12 is a positive value, the output unit 13 calculates the instruction value such that the driving force of the vehicle 100 increases as the acceleration request value increases. When the acceleration request value selected by the arbitration unit 12 is a negative value, the output unit 13 calculates the instruction value such that the braking force of the vehicle 100 increases as the acceleration request value decreases. The output unit 13 calculates the instruction value for each actuator system in this manner. When each instruction value is calculated, the output unit 13 outputs each calculated instruction value to each actuator system. Then, the management ECU 10 temporarily terminates the series of processes in the normal process as shown in FIG. 4. Then, the management ECU 10 executes the process of step S11 again.

Degeneration Necessity Determination Process

Prior to describing the specific process, the degeneration necessity determination process will be described. The degeneration unit 15 executes the degeneration necessity determination process every time the arbitration unit 12 executes the arbitration step in the normal process.

Figure 5:
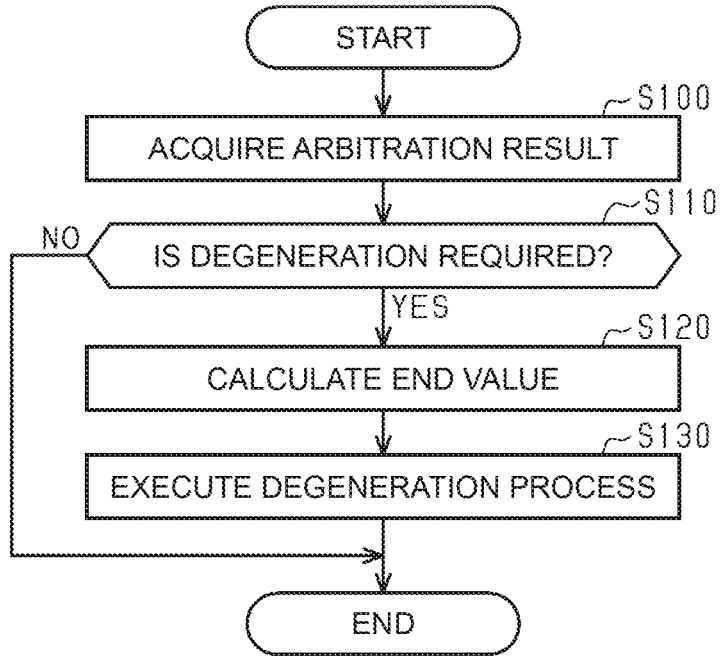
FIG. 5 is a flowchart showing a processing procedure of a degeneration necessity determination process.

As shown in FIG. 5, the degeneration unit 15 first executes a process of step S100 in the degeneration necessity determination process. In step S100, the degeneration unit 15 acquires the latest arbitration result output by the arbitration unit 12. That is, as shown in FIG. 1, the degeneration unit 15 acquires the reception data including the acceleration request value selected by the arbitration unit 12. When the new reception data is acquired, the degeneration unit 15 clears the previously acquired reception data. As shown in FIG. 5, when the reception data is acquired, the degeneration unit 15 advances the process to step S110.

In step S110, the degeneration unit 15 determines whether the acceleration request value selected by the arbitration unit 12 is an acceleration request value that requires degeneration. The degeneration unit 15 makes this determination by referring to the information included in the reception data and indicating whether degeneration is necessary. When the acceleration request value selected by the arbitration unit 12 is not the acceleration request value that requires degeneration (step S110: NO), the degeneration unit 15 terminates the degeneration necessity determination process.

When the acceleration request value selected by the arbitration unit 12 is the acceleration request value that requires degeneration in step S110 (step S110: YES), the degeneration unit 15 advances the process to step S120.

In step S120, the degeneration unit 15 calculates an end value serving as a final target value for calculation of a degeneration value in the subsequent degeneration process. The degeneration unit 15 grasps the following by referring to the management table, the identifier of the application AP included in the reception data, the failure information, and the like. That is, the degeneration unit 15 grasps characteristics of degeneration requested under the current failure details for the first application subjected to the degeneration process. As described above, the degeneration characteristics are one of the pieces of information included in the management table. When the degeneration characteristics are grasped, the degeneration unit 15 calculates the end value based on the degeneration characteristics and current traveling conditions of the vehicle 100. Examples of the traveling conditions of the vehicle 100 include a traveling speed of the vehicle 100 and a braking force applied to the vehicle 100. Due to the setting of the first application, the acceleration request value acquired by the degeneration unit 15 in step S100 is a negative value. The degeneration unit 15 calculates the end value as a value larger than this acceleration request value. The end value may be a positive value, a negative value, or zero. The end value is basically determined to be a value larger than the acceleration request value from the application AP other than the application AP subjected to the degeneration process. When the end value is calculated, the degeneration unit 15 advances the process to step S130.

In step S130, the degeneration unit 15 executes the degeneration process. At this time, the degeneration unit 15 switches, from OFF to ON, a degeneration flag indicating that the degeneration process is being executed. Then, the degeneration unit 15 starts the degeneration process. In the degeneration process, the degeneration unit 15 repeats calculation of the degeneration value in a predetermined third cycle. The third cycle is, for example, the same as the second cycle. The degeneration unit 15 calculates the degeneration value as follows. The degeneration unit 15 handles the acceleration request value acquired in step S100 as an initial degeneration value. As described above, the initial value is a negative value due to the setting of the first application. When calculating a new degeneration value, the degeneration unit 15 adds a predetermined positive value to the previous degeneration value. The degeneration unit 15 uses the obtained value as the new degeneration value. In this manner, the degeneration unit 15 repeatedly calculates the degeneration value. The degeneration unit 15 repeats the calculation of the degeneration value until the degeneration value reaches the end value. When the degeneration value has reached the end value, the degeneration unit 15 terminates the calculation of the degeneration value. In the degeneration process, the degeneration unit 15 outputs the calculated degeneration value to the reception unit 11 every time the degeneration value is calculated. When outputting the degeneration value, the degeneration unit 15 outputs degeneration data including a set of the degeneration value, information indicating that the value is the degeneration value, and the identifier of the first application subjected to the degeneration process. When the calculation of the degeneration value is terminated in response to the degeneration value reaching the end value, the degeneration unit 15 terminates the degeneration process. Along with this, the degeneration unit 15 switches the degeneration flag from ON to OFF. The degeneration unit 15 terminates the degeneration necessity determination process.

Specific Process

The specific process will be described in detail. As a premise, in the present embodiment, when the degeneration flag is ON, the command ECU 50 continues to execute the AD application AP2. When the degeneration flag is ON, the command ECU 50 continues to execute the first application subjected to the degeneration process. When a specific first application such as the AEB application AP1 is subjected to the degeneration process, the command ECU 50 repeatedly outputs the acceleration request value serving as the initial value for the degeneration process. For example, the degeneration unit 15 outputs degeneration execution information to the command ECU 50 during the degeneration process. Therefore, the command ECU 50 can grasp the processing details of the management ECU 10 and reflect them in its process. The degeneration execution information includes information indicating that the degeneration flag is ON, and the identifier of the first application subjected to the degeneration process. The command ECU 50 may terminate the execution of the first application subjected to the degeneration process in the middle of the period in which the degeneration flag is ON. In this case, the management ECU 10 performs the following pseudo-handling only while the degeneration flag is ON. That is, the management ECU 10 handles the above initial value as being output from the first application subjected to the degeneration process.

The management ECU 10 executes the specific process instead of the normal process under the condition that the degeneration flag is ON. That is, as shown in FIG. 3, the management ECU 10 executes the specific process during the execution period N of the degeneration process. The execution period N of the degeneration process is a target period L for the specific process, and the period other than the execution period N of the degeneration process is a target period T for the normal process. The management ECU 10 repeats the specific process in the second cycle during the execution period N of the degeneration process. The specific process is basically the same as the normal process. Therefore, the specific process will be described below focusing on differences from the normal process.

As shown in FIG. 4, the management ECU 10 first executes the reception step in step S11 in the specific process. In the reception step, the reception unit 11 of the management ECU 10 receives an acceleration request value from each application AP together with the identifier of the application AP similarly to the normal process. For the acceleration request value from the first application subjected to the degeneration process, as exemplified by the AEB application AP1 in FIG. 6, the reception unit 11 receives the latest degeneration value output by the degeneration unit 15 instead of this acceleration request value. The specific process is executed in a situation where a vehicle failure associated with the first application subjected to the degeneration process is detected. Therefore, the acceleration request value from the first application subjected to the degeneration process is an acceleration request value that requires degeneration. That is, the reception unit 11 receives, in the reception step, a degeneration value instead of the acceleration request value that requires degeneration from the first application. For the acceleration request value from the first application other than the first application subjected to the degeneration process, the reception unit 11 cancels reception of the acceleration request value in the reception step when it is an acceleration request value that requires degeneration. The reception unit 11 discriminates the acceleration request value to be received and the acceleration request value not to be received by referring to the identifier of the application AP, the management table, the failure information, and the like included in the degeneration data output from the degeneration unit 15. The reception unit 11 outputs the acceleration request value received as described above to the arbitration unit 12 as reception data in the same format as that in the normal process. The reception unit 11 outputs, to the arbitration unit 12, the reception data associated with at least two values that are the acceleration request value from the AD application AP2 and the degeneration value. For the reception data related to the degeneration value, the reception unit 11 sets information indicating that degeneration is necessary as the information indicating whether degeneration is necessary. That is, the reception unit 11 handles the degeneration value as one type of acceleration request value that requires degeneration. The degeneration value is an acceleration request value from the first application that is calculated by the management ECU 10 instead of the command ECU 50 in accordance with a kinematic plan defined by the first application. As described above, the specific process is executed in the situation where a vehicle failure associated with the first application subjected to the degeneration process is detected. Therefore, the degeneration value is an acceleration request value that requires degeneration from the first application. As shown in FIG. 4, when each piece of reception data is output, the management ECU 10 advances the process to step S12.

Figure 6:
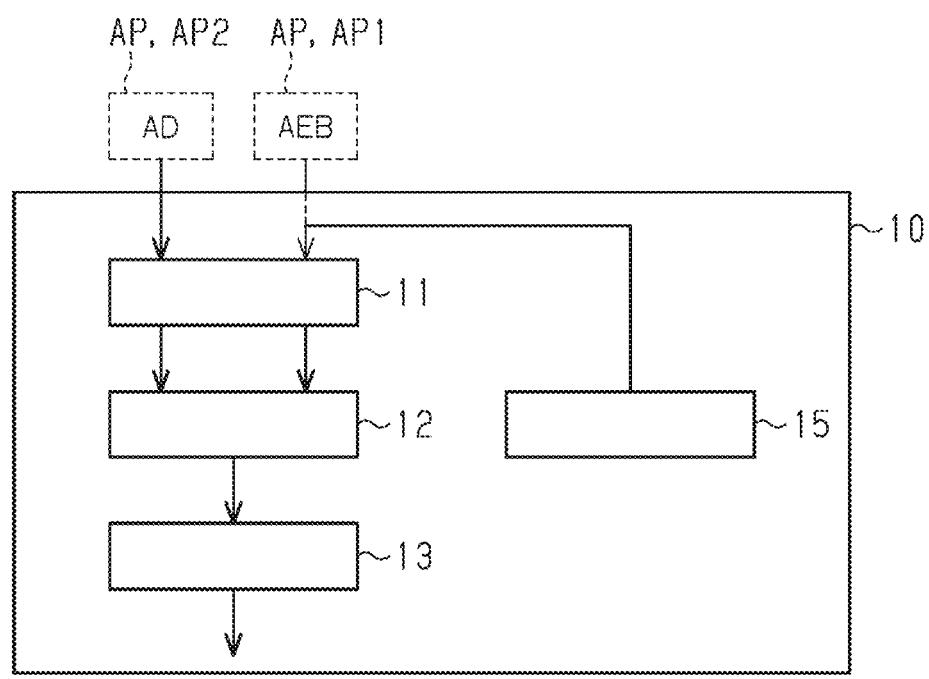
FIG. 6 is a schematic diagram showing flows of information between functional units in the specific process.

In step S12, the arbitration unit 12 of the management ECU 10 executes the arbitration step. The arbitration unit 12 selects the smallest acceleration request value from among the plurality of acceleration request values received in the reception step similarly to the normal process. As shown in FIG. 6, the arbitration unit 12 outputs the selected acceleration request value to the output unit 13. Then, the management ECU 10 advances the process to step S13 as shown in FIG. 4.

In step S13, the output unit 13 of the management ECU 10 executes the output step. As shown in FIG. 6, the output unit 13 outputs, in the output step, an instruction value corresponding to the acceleration request value selected by the arbitration unit 12 to each actuator system similarly to the normal process. Illustration of the actuator systems is omitted in FIG. 6. When the arbitration unit 12 has selected the degeneration value, the output unit 13 outputs an instruction value corresponding to the degeneration value to each actuator system. As described in the reception step, the degeneration value corresponds to an acceleration request value that requires degeneration from the first application. That is, when the arbitration unit 12 has selected the acceleration request value that requires degeneration from the first application, the output unit 13 outputs an instruction value corresponding to the degeneration value. When the arbitration unit 12 has selected the acceleration request value from the second application, the output unit 13 outputs an instruction value corresponding to the acceleration request value from the second application to each actuator system. The method for calculating the instruction value is the same as that in the normal process, and therefore description thereof is omitted. As shown in FIG. 4, when the instruction value is output, the management ECU 10 temporarily terminates the series of processes in the specific process. Then, the management ECU 10 executes the process of step S11 again.

Operations of Embodiment

Figure 7:
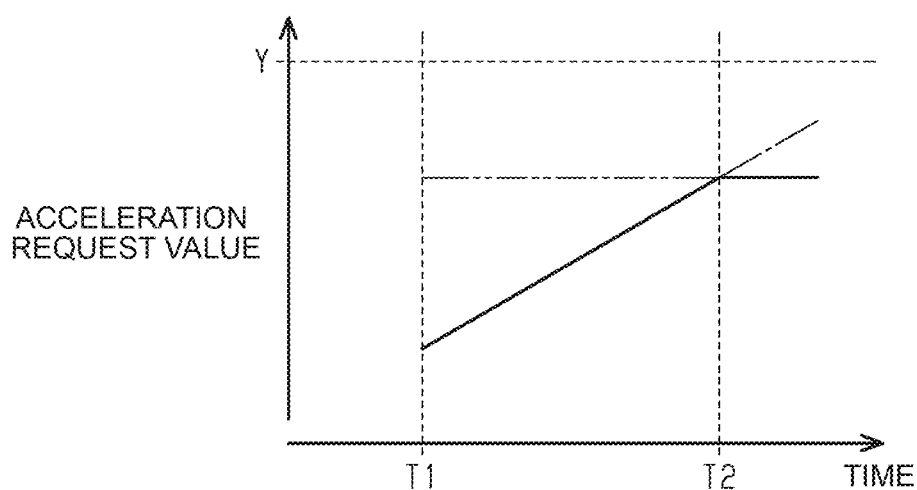
FIG. 7 is a diagram showing an example of transition of an acceleration request value during execution of a degeneration process.

It is assumed that the AD application AP2 is currently being executed. It is assumed that the management ECU 10 continues to select the acceleration request value of the AD application AP2 in the normal process. That is, the vehicle 100 is performing autonomous driving. It is assumed that a situation arises in which emergency braking of the vehicle 100 is required during the autonomous driving of the vehicle 100. It is assumed that the AD application AP2 outputs a negative acceleration request value. It is assumed that the AEB application AP1 is also activated at this time. In this case, due to the settings of these applications AP, the AEB application AP1 outputs a negative acceleration request value whose absolute value is larger than that of the acceleration request value of the AD application AP2. It is assumed that a vehicle failure associated with the AEB application AP1 is detected at this time. In this case, the management ECU 10 receives, in the reception step of the normal process, the acceleration request value from the AEB application AP1 as the acceleration request value that requires degeneration. In the arbitration step of the normal process, the management ECU 10 selects the acceleration request value of the AEB application AP1 that is the smaller one of the acceleration request value from the AD application AP2 and the acceleration request value from the AEB application AP1. In response to this selection result, the degeneration unit 15 of the management ECU 10 starts the degeneration process. The degeneration unit 15 repeatedly calculates the degeneration value of the acceleration request value of the AEB application AP1. In FIG. 7, the continuous line indicates the degeneration value from time T1 to time T2 in an initial stage of execution of the degeneration process. As indicated by this continuous line, the degeneration value approaches an end value Y over time.

When the degeneration process is started, the management ECU 10 cancels the normal process and executes the specific process. As shown in FIG. 6, the management ECU 10 receives, in the reception step of the specific process, the acceleration request value from the AD application AP2 and the degeneration value calculated by the degeneration unit 15 in the degeneration process. In the initial stage of the degeneration process, the degree of degeneration of the degeneration value is small. Therefore, as shown in FIG. 7, from time T1 to time T2 in the initial stage, the management ECU 10 selects, in the arbitration step of the specific process, the degeneration value that is the smaller one of the acceleration request value of the AD application AP2 indicated by the long dashed double-short dashed line and the degeneration value indicated by the continuous line. In the output step, the management ECU 10 outputs an instruction value corresponding to this degeneration value to the actuator system. FIG. 7 shows an example in which the acceleration request value from the AD application AP2 is constant.

As described above, the degeneration value approaches the end value Y as the time elapses from time T1 to time T2. Accordingly, the degeneration value is larger than the negative acceleration request value of the AD application AP2 at time T2. After time T2 in FIG. 7, the acceleration request value of the AD application AP2 is indicated by a continuous line, and the degeneration value is indicated by a long dashed short dashed line. When the degeneration value is larger than the acceleration request value of the AD application AP2 after time T2, the management ECU 10 executes the following process in the arbitration step of the specific process. That is, the management ECU 10 selects the acceleration request value of the AD application AP2 that is the smaller one of the acceleration request value of the AD application AP2 and the degeneration value. In the output step, the management ECU 10 outputs an instruction value corresponding to the acceleration request value of the AD application AP2 to the actuator system. In general, the management ECU 10 selects the acceleration request value indicated by the continuous line in FIG. 7 after time T1. The transition of the degeneration value and the acceleration request value from the AD application AP2 shown in FIG. 7 is merely an example for the description of the operations of the embodiment, and does not necessarily agree with the actual one.

Due to the setting of the AEB application AP1, the output of the acceleration request value from the AEB application AP1 is stopped in the stage where the degeneration process is terminated or in the stage before that. Therefore, when the normal process is resumed along with the termination of the degeneration process, the management ECU 10 outputs, to the actuator system, an instruction value corresponding to the acceleration request value of the AD application AP2, continuing from the middle of the degeneration process.

Effects of Embodiment (1) As described in the above operations, when the management ECU 10 has selected an acceleration request value that requires degeneration from the first application in the arbitration step of the normal process, the management ECU 10 executes the specific process onward. In the reception step, the reception unit 11 receives a degeneration value that approaches the end value over time. In the arbitration step, the arbitration unit 12 eventually selects the acceleration request value from the AD application AP2. The output unit 13 outputs an instruction value reflecting this selection result to the actuator system. With the configuration of the present embodiment, it is possible to prevent continuation of a situation where the request from the AD application AP2 cannot be realized for a long period. For example, even if degeneration is necessary for the braking request in a situation where emergency braking is required, the vehicle 100 can reliably be braked based on the request from the AD application AP2 without terminating the braking control halfway.

(2) When no failure is detected in the vehicle 100, the reception unit 11 receives the acceleration request value from the first application as an acceleration request value that does not require degeneration. Therefore, it is possible to prevent rejection of the request from the first application in the arbitration step when no failure is detected in the vehicle 100.

Modifications

The above embodiment can be modified as follows. The above embodiment and the following modifications may be combined as long as no technical contradiction arises.

The output unit 13 of the above embodiment outputs the instruction value corresponding to the acceleration request value selected by the arbitration unit 12 to the actuator system in the normal process. When this mode is adopted, the processing details of the output unit 13 in the specific process may be changed as follows. That is, the output unit 13 need not output the instruction value corresponding to the acceleration request value selected by the arbitration unit 12 or the degeneration value to the actuator system in the specific process. For example, in the specific process, when the arbitration unit 12 has selected the degeneration value, the output unit 13 may output, to the actuator system, an instruction value corresponding to the acceleration request value serving as the initial value for the degeneration process instead of the instruction value corresponding to the degeneration value. When the normal process of the above embodiment is executed as a basic process, the output unit 13 may output, in the specific process, an instruction value corresponding to a value other than the acceleration request value selected by the arbitration unit 12 or the degeneration value.

As described in the above modification, the details of the specific process are not limited to the example in the above embodiment. In the specific process, it is appropriate that the reception unit 11 receive the degeneration value instead of the acceleration request value that requires degeneration from the first application.

The timing to terminate the degeneration process is not limited to the example in the above embodiment. For example, the degeneration process may be terminated when the degeneration value is larger than the acceleration request value from the second application.

The method for calculating the degeneration value in the degeneration process is not limited to the example in the above embodiment. For example, a predetermined value used to calculate the degeneration value may gradually be increased or reduced during the execution of the degeneration process. The predetermined value may be set to a different value for each application AP. As long as the acceleration request value can be brought closer to the end value over time, the method for calculating the degeneration value is not limited.

The method for calculating the end value is not limited to the example in the above embodiment. In the above embodiment, the management table includes the information on the degeneration characteristics. The information on the degeneration characteristics may be output by the command ECU 50 when executing the first application. That is, when a specific first application is executed, the command ECU 50 may calculate the information on the degeneration characteristics together with the acceleration request value and output them to the management ECU 10. Alternatively, the command ECU 50 may calculate and output the end value when the first application is executed. Even in this case, it is appropriate that the details of the program of the first application be determined to calculate an appropriate end value based on the traveling conditions of the vehicle 100 and the like. The management ECU 10 may determine the end value based on the information from the command ECU 50. It is appropriate that the end value be predetermined before the degeneration value is calculated.

It is not essential that the information output by the command ECU 50 when executing the application AP includes the identification value of the execution target application AP. For example, the command ECU 50 may output various types of information other than the identification value of the application AP, which are included in the management table of the above embodiment, together with the acceleration request value from the application AP. Based on those pieces of information, the management ECU 10 may make determination similar to that in the above embodiment to implement each process.

The acceleration request value from the first application may constantly be received as the acceleration request value that requires degeneration regardless of whether a failure has occurred in the vehicle 100. For example, an application AP that undergoes such reception and an application AP that undergoes reception similar to that of the above embodiment may be set among the plurality of first applications. An appropriate reception method may be set depending on the function of each first application.

The specific process may be executed only when a first application designated in advance among the plurality of first applications is subjected to the degeneration process. When a first application other than the designated first application is subjected to the degeneration process, an instruction value corresponding to the degeneration value may be output to the actuator system during the execution of the degeneration process until the degeneration value reaches the end value. Depending on the combination of the applications AP stored in the command ECU 50, it may be necessary to complete degeneration of control. The number of applications AP designated for the execution of the specific process may be one or plural.

In the above embodiment, the normal process is executed while the AD application AP2 is being executed. However, the normal process may be executed when the AD application AP2 is not executed. As in the above embodiment, transition may be made to the specific process when an acceleration request value that requires degeneration is received from the first application in the normal process.

It is not essential that the applications AP stored in the command ECU 50 include the AEB application AP1. Similarly, it is not essential that the applications AP stored in the command ECU 50 include the AD application AP2. The mode of the above embodiment is not limited to these applications AP, and is effective when an acceleration request value that requires degeneration is received from the first application and an acceleration request value that does not require degeneration is received from the second application.

The applications AP stored in the command ECU 50 may include a first application that outputs a positive acceleration request value. During execution of the degeneration process for this application AP, another appropriate process may be executed instead of the specific process to output an optimum instruction value to each actuator system.

The command ECU 50 and the management ECU 10 need not be configured as separate processing devices, but a single processing device may have the functions of the command ECU 50 and the management ECU 10. Similarly, for example, the ECU of the actuator system may have the functions of the management ECU 10.

A motor generator may be mounted on the vehicle 100 instead of or in addition to the engine 71 as the drive source for the vehicle 100. In this case, it is appropriate that the vehicle 100 include an actuator system including a motor generator that is an actuator and an ECU that controls the motor generator.

The management ECU 10 is not limited to the ECU that includes the CPU and the memories and executes software processes. That is, the management ECU 10 may have any one of the following configurations (a), (b), and (c). In this regard, the same applies to the other ECUs.

(a) The management ECU 10 includes one or more processors that execute various processes based on computer programs. The processor includes a CPU and memories such as a random access memory (RAM) and a read only memory (ROM). The memory stores program codes or commands configured to cause the CPU to execute processes. The memory, that is, a computer-readable medium, includes any available media that can be accessed by a general purpose or special purpose computer.

(b) The management ECU 10 includes one or more dedicated hardware circuits that execute various processes. Examples of the dedicated hardware circuits include an application specific integrated circuit (ASIC) and a field programmable gate array (FPGA).

(c) The management ECU 10 includes a processor that executes a part of various processes based on computer programs, and a dedicated hardware circuit that executes the rest of the various processes.

What is claimed is:

1. A vehicle motion manager comprising one or more processors configured to:
    receive acceleration request values from a first application and a second application, the acceleration request value received from the first application being a first acceleration request value that requires degeneration, the acceleration request value received from the second application being a second acceleration request value that does not require the degeneration;
    select a smallest acceleration request value out of the acceleration request values received by the one or more processors;
    when the one or more processors select the first acceleration request value, repeatedly output a degeneration value based on the first acceleration request value, an initial value of the degeneration value being the first acceleration request value, and the repeatedly output degeneration value approaching a predetermined end value over time; and
    output an instruction value corresponding to the acceleration request value selected by the one or more processors or the degeneration value to an actuator of a vehicle, wherein
    the one or more processors are configured to, in response to selection of the first acceleration request value, receive the degeneration value output by the one or more processors instead of the first acceleration request value received from the first application.

2. The vehicle motion manager according to claim 1, wherein the one or more processors are configured to:
    when the first acceleration request value is selected, output an instruction value corresponding to the degeneration value to the actuator; and
    when the second acceleration request value is selected, output an instruction value corresponding to the second acceleration request value to the actuator.

3. The vehicle motion manager according to claim 1, wherein the one or more processors are configured to, when a failure of the vehicle is detected, receive the acceleration request value from the first application as the first acceleration request value that requires the degeneration.

4. A vehicle control method to be executed by a computer mounted on a vehicle, the vehicle control method comprising:
    receiving acceleration request values from a first application and a second application, the acceleration request value received from the first application being a first acceleration request value that requires degeneration, the acceleration request value received from the second application being a second acceleration request value that does not require the degeneration;
    selecting a smallest acceleration request value out of the received acceleration request values;

when the first acceleration request value is selected in the selecting of the acceleration request value, repeatedly outputting a degeneration value based on the first acceleration request value, an initial value of the degeneration value being the first acceleration request value, and the repeatedly output degeneration value approaching a predetermined end value over time; and outputting an instruction value corresponding to the acceleration request value selected in the selecting of the acceleration request value or the degeneration value to an actuator of the vehicle, wherein the method further comprises receiving, in response to selection of the first acceleration request value in the selecting of the acceleration request value, the output degeneration value instead of the first acceleration request value received from the first application.

5. A non-transitory storage medium storing instructions that are executable by a computer mounted on a vehicle and that cause the computer to perform functions comprising:

receiving acceleration request values from a first application and a second application, the acceleration request value received from the first application being a first acceleration request value that requires degeneration, the acceleration request value received from the second application being a second acceleration request value that does not require the degeneration;

selecting a smallest acceleration request value out of the received acceleration request values;

when the first acceleration request value is selected in the selecting of the acceleration request value, repeatedly outputting a degeneration value based on the first acceleration request value, an initial value of the degeneration value being the first acceleration request value, and the repeatedly output degeneration value approaching a predetermined end value over time; and outputting an instruction value corresponding to the acceleration request value selected in the selecting of the acceleration request value or the degeneration value to an actuator of the vehicle, wherein the functions further comprise receiving, in response to selection of the first acceleration request value in the selecting of the acceleration request value, the output degeneration value instead of the first acceleration request value received from the first application.

* * * * *

UNITED STATES PATENT AND TRADEMARK OFFICE
CERTIFICATE OF CORRECTION

| | | |
|---|---|---|
| PATENT NO. | : 12,311,936 B2 | Page 1 of 1 |
| APPLICATION NO. | : 18/533295 | |
| DATED | : May 27, 2025 | |
| INVENTOR(S) | : Yuta Ohashi et al. | |

It is certified that error appears in the above-identified patent and that said Letters Patent is hereby corrected as shown below:

On the Title Page

Item (30) add after item (65):
-- (30) Foreign Application Priority Data
February 7, 2023 (JP) 2023-017024 --

Signed and Sealed this
Fifteenth Day of July, 2025

Coke Morgan Stewart
*Acting Director of the United States Patent and Trademark Office*